United States Patent
Zhang et al.

(10) Patent No.: US 11,861,362 B1
(45) Date of Patent: Jan. 2, 2024

(54) APPLICATION MIGRATION AND MODERNIZATION ACTION COMPLETION TIME FORECASTING

(71) Applicant: Amazon Technologies, Inc., Seattle, WA (US)

(72) Inventors: Jiangtao Zhang, Pleasanton, CA (US); Ramu Panayappan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 17/211,486

(22) Filed: Mar. 24, 2021

(51) Int. Cl.
 *G06F 8/76* (2018.01)
 *G06N 20/00* (2019.01)

(52) U.S. Cl.
 CPC .............. *G06F 8/76* (2013.01); *G06N 20/00* (2019.01)

(58) Field of Classification Search
 CPC .................................. G06F 8/76; G06N 20/00
 See application file for complete search history.

(56) References Cited

U.S. PATENT DOCUMENTS

| | | | | |
|---|---|---|---|---|
| 2012/0296853 A1* | 11/2012 | Galloway | ................. | G06F 8/76 705/400 |
| 2017/0192825 A1* | 7/2017 | Biberman | ........... | H04W 28/095 |
| 2019/0138338 A1* | 5/2019 | Shimogawa | ............ | G06F 9/505 |
| 2021/0132927 A1* | 5/2021 | Dinh | ........................ | G06F 8/60 |

OTHER PUBLICATIONS

Byung Chul Tak et al. "PseudoApp: Performance Prediction for Application Migration to Cloud", [Online], pp. 303-310, [Retrive from Interent on Aug. 26, 2023], <https://ieeexplore.ieee.org/stamp/stamp.jsp?tp=&arnumber=6572999> (Year: 2011).*

* cited by examiner

*Primary Examiner* — Ziaul A Chowdhury
(74) *Attorney, Agent, or Firm* — Nicholson De Vos Webster & Elliott LLP

(57) ABSTRACT

Techniques are described for enabling software migration and modernization services of a cloud provider network to provide completion time forecasts for various types of migration and modernization actions performed by the services relative to users' software applications. A cloud provider network provides a software migration and modernization orchestration service that helps users orchestrate the use of various software migration and modernization services. Depending on the technical characteristics of a user's application and the selection of migration and modernization processes to be performed, an amount of time needed to complete migration and modernization actions can vary widely. The migration and modernization services of the cloud provider network each train and use machine learning (ML) models to forecast an amount of time needed to complete various actions based on historical action execution data collected by the services, thereby providing useful insights into complex migration and modernization processes.

20 Claims, 8 Drawing Sheets

US 11,861,362 B1

APPLICATION MIGRATION AND MODERNIZATION ACTION COMPLETION TIME FORECASTING

BACKGROUND

Software migration and modernization techniques are widely used by business organizations and other entities desiring to improve their information technology (IT) environments in response to changing software application use cases, resource demands, and user access patterns. For example, while many legacy applications were designed for older operating environments with lesser resources and expectations, modern applications now often need the ability to scale quickly to potentially millions of users, have global availability, manage very large amounts of data, and respond to requests in milliseconds. The various processes for upgrading, converting, and rewriting such applications to enable improved performance is referred to generally as "software modernization." Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
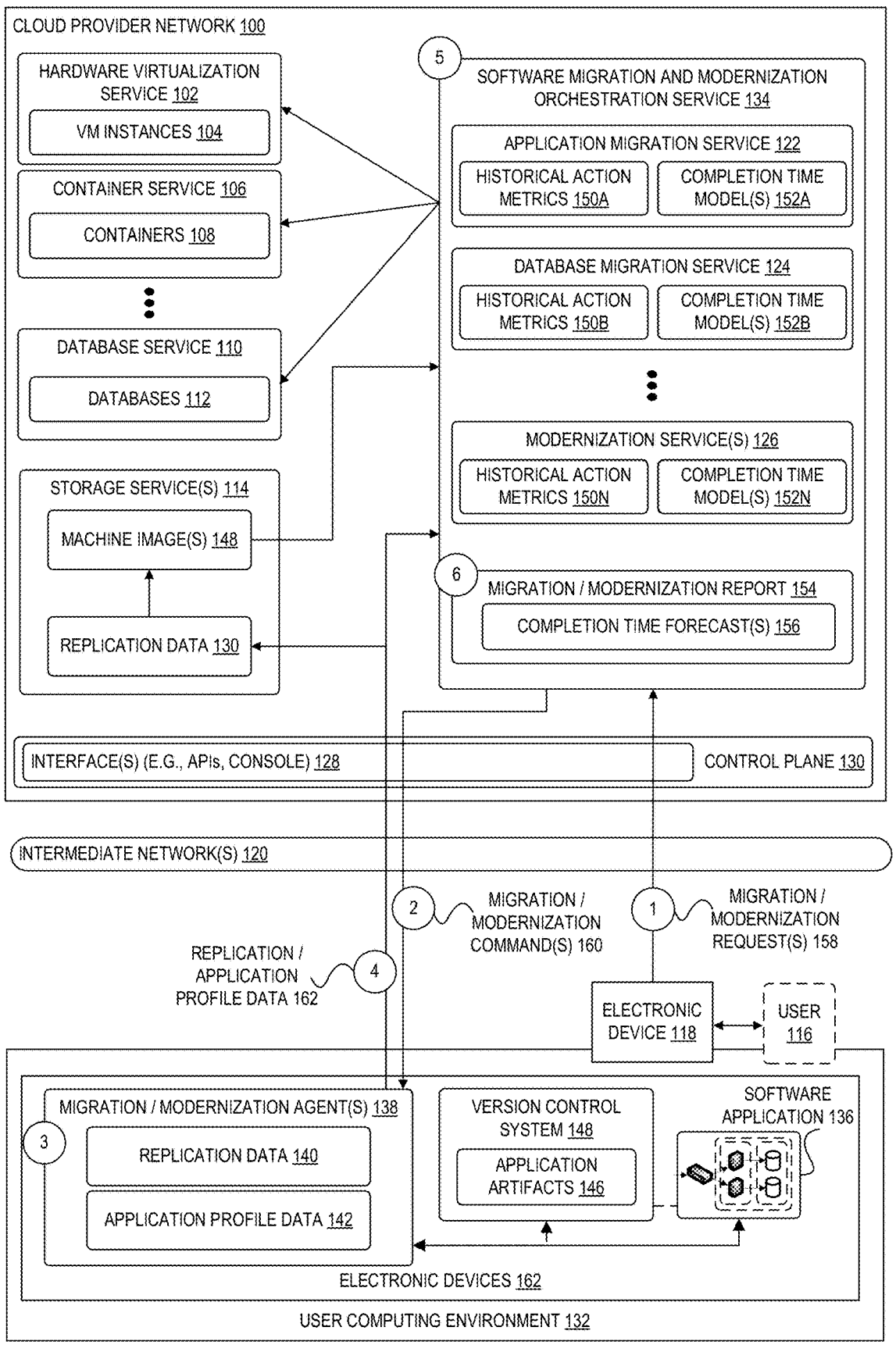
FIG. 1 is a diagram illustrating an environment that enables software migration and modernization services of a cloud provider network to provide action completion time forecasts for various migration and modernization actions performed relative to users' software applications and software-based systems according to some embodiments.

The present disclosure relates to methods, apparatus, systems, and non-transitory computer-readable storage media for enabling software migration and modernization services of a cloud provider network to provide completion time forecasts for various types of migration and modernization actions performed by the services relative to users' software applications and systems. In some embodiments, a cloud provider network provides a software migration and modernization orchestration service that helps users orchestrate the use of various tools and services used to migrate and modernize software applications and associated systems (e.g., servers, databases, networks, etc.) running in users' on-premises environments to infrastructure provided by a cloud provider network. Depending on the technical characteristics of users' software applications and the selection of migration and modernization actions and action workflows to be performed, an amount of time needed to complete such actions can vary widely. According to embodiments described herein, migration and modernization services of the cloud provider network train and use machine learning (ML) models to forecast an amount of time needed to complete such actions based on historical action execution data collected by the services, thereby providing useful insights into complex migration and modernization actions and action workflows.

Many cloud providers provide services that help users to migrate and modernize software applications located in their on-premises data centers or other computing environments to infrastructure provided by a cloud provider network. The migration and modernization of a given user's application might typically involve several related actions including, for example, collecting application profile data, analyzing the profile data to obtain migration and modernization recommendations, obtaining replication data associated with the applications, converting virtual machine (VM) images, creating containers, refactoring source code, and the like. The amount of time needed to perform these actions for an application depends on several factors such as, for example, a type of software application, a type of software application architecture used to implement the application, a size of collected snapshot data, network bandwidth available at the users' data center, an operating system and server versions and types, a number of storage volumes, a type of filesystem, a number of cloud services to be used, and so forth. While users may typically be provided with information indicating a duration of time used to perform such migration and modernization actions after the actions are completed, users generally lack information about how much time such actions are expected to take in advance. Among other challenges, this lack of information makes it difficult for users and migration and modernization systems to select and plan optimal migration and modernization action workflows and to obtain completion time information about in-progress actions and action workflows.

These challenges, among others, are addressed by enabling software migration and modernization services to forecast an amount of time needed to complete various software migration and modernization actions. In some embodiments, a software migration or modernization service collects historical actions metrics from data sources including users' computing environments, migration or modernization agents, and migration or modernization services and tools used to implement the migration and modernization actions. The collected historical actions metrics are used to train ML-based models (e.g., linear regression models) or other types of models that can forecast an estimated action completion time based on the technical characteristics of a given application and the actions to be performed. In some embodiments, the action time completion forecasts can be used to identify optimal migration and modernization orchestration plans where several different orchestration plans are possible, to gain insight into estimated completion percentages for in-progress actions, action workflows, or orchestration plans, among other uses. The ability to obtain migration and modernization completion time forecasts for a given software application and to identify optimal actions, action workflows, and orchestration plans enables the development of more robust and resilient software applications, improves users' ability to modernize and migrate software applications to cloud-based execution environments, and enables software applications to use more efficient cloud-based computing resources to support their execution.

FIG. 1 is a diagram illustrating an environment that enables software migration and modernization services of a cloud provider network to provide action completion time forecasts for various migration and modernization actions performed relative to users' software applications and systems according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 102 that can execute compute instances (e.g., VM instances 104), a container service 106 that can execution containers (e.g., containers 108), a database service 110 that provides databases (e.g., database 112), and storage service(s) 114 that can store data objects, etc. The users (or "customers") (e.g., a user 116) of provider networks 100 may utilize one or more user accounts that are associated with a customer account, though these terms may be used somewhat interchangeably depending upon the context of use. Users may interact with a provider network 100 via an electronic device (e.g., electronic device(s) 118) across one or more intermediate networks 120 (e.g., the internet) via one or more interface(s) 128, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane 130 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance (s) involved.

As indicated above, a cloud provider network 100 typically provides a wide variety of computing-related services. For example, the hardware virtualization service 102 (referred to in various implementations as an elastic compute service, a virtual machines service, a computing cloud service, a compute engine, or a cloud compute service) enables users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 106 can be a container orchestration and management service (referred to in various implementations as a container service, cloud container service, container engine, or container cloud service) that allows users of the cloud provider network to instantiate and manage containers. In some embodiments the container service 106 may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated, users responsible for the development and administration of various types of software applications or workloads may wish to migrate their enterprise applications from on-premises environments (e.g., from a user computing environment 132) to a cloud provider network 100 to take advantage of the performance, scalability, and cost advantages of cloud provider networks. The software applications and systems that users desire to migrate typically consist of multiple individual components like compute (e.g., VM instances, containers, database servers, etc.), network, and storage components. Users currently often use many different services and tools to migrate these various types of components to cloud. For example, users might use a server migration service 122 to migrate compute instances, a database migration service 124 to migrate databases, use one or more backup services, and use one or more modernization services 126 to modernize their application for the cloud in various ways. Users typically coordinate the migration and modernization actions performed by each such service individually, manually configure and launch the selected migration and modernization actions, and run tests to validate the results. These manual processes are often further repeated at regular intervals during application's migration life cycle until the user is satisfied with the migration. Migration actions refer to steps that are taken to move the code and data of these applications from the customer's computing devices (e.g., on-premise servers) to cloud infrastructure. A successful migration can involve not only moving the application and data to the cloud infrastructure, but also modernizing the application. Modernization actions refer to the actions taken for existing legacy applications to modernize their platform infrastructure, internal architecture, and/or features. Examples include decomposing monolithic applications into microservices, restructuring an application to use cloud services, and bringing applications into cloud architecture and release patterns such as DevOps and CI/CD. Accordingly, some orchestration plans may include both migration actions and modernization actions, sometimes referred to herein collectively as cloud migration actions.

In some embodiments, to alleviate users from managing many of the processes described above and others, a software migration and modernization orchestration service 134 is provided to help orchestrate and automate migration and modernization actions and action workflows. At a high level, users can use a software migration and modernization orchestration service 134 to identify a software application of interest (e.g., a software application 136 in the user's computing environment 132), provide input indicating how the user desires for the application to be migrated and modernized, validated, launched, etc., and have provided one or more possible migration and modernization orchestration plans to accomplish the user's goals. For example, based on the input provided by the user and additional information optionally collected about the user's application from the user's environment, the software migration and modernization orchestration service 134 can generate migration and modernization orchestration plans including a set of actions or action workflows performed by associated migration and modernization services (e.g., a server migration service 122, database migration service 124, modernization service(s) 126, etc.) and implement the orchestration plans on an individual or recurring basis.

As part of the orchestration services described above or separately, in some embodiments, the migration and modernization services of a cloud provider network include various discovery services, assessment services, and transformation services, collectively aimed at helping users to discover and use recommended software migration and modernization workflows for their software applications. The discovery services, for example, may provide downloadable migration and modernization agent(s) 138 and other tools that can be used to generate an inventory of software applications in a user's computing environment 132 and to collect application profile data (e.g., application profile data 142) for software applications undergoing migration and modernization processes. In some embodiments, an assessment services enable users and applications to obtain various types of application migration and modernization assessments and recommendations, e.g., based on application profile data collected by the discovery services. The recommendations provided by an assessment service can include, for example, recommended migration and modernization strategies, migration and modernization tools, estimated migration and modernization costs, recommended software architectures for a software application, etc. The transformation services provide various types of migration and modernization tools to assist with performing migration modernization processes, e.g., to assist users with obtaining replication data 140 in their own computing environments, containerizing applications, refactoring an application based on generated source code recommendations, deploying a modernized application using one or more other services of the cloud provider network 100, and the like.

In some embodiments, a user may initially access the software migration and modernization orchestration service 134 to obtain information about various available migration and modernization services and to download one or more agents 138. In some embodiments, users can obtain one or more agent(s) 138 by downloading the agents via a web-based console or other interface and installing the agents within a user's computing environment 132 to assist with migration modernization-related processes. For example, in some embodiments, an agent 138 collects and generates application profile data 142 based on application artifacts (e.g., source code or other types of application artifacts 146 such as bytecode, Common Intermediate Language (CIL) code, etc., used to implement a software application 136 and possibly stored in a version control system 148) and monitors the execution of the software application 136. As described in more detail herein, once such application profile data 142 is obtained, in some embodiments, the data can be used as input to one or more completion time models (e.g., one or more of completion time models 152A-152N) to identify a forecasted amount of time to complete various migration and modernization action involving the application. In some embodiments, these completion time forecasts 156 can be provided as part of a migration and modernization orchestration status report 154 or used as part of the other migration or modernization-related actions.

In some embodiments, the agents 138 are installed on servers or other electronic devices 162 within a user's on-premises computing environment 132 (e.g., on physical servers or VMs). Users (e.g., a user 116) can use a computing device 118 to interact with an agent 138 via a command line interface (CLI), graphical user interface (GUI), or any other type of interface provided by an agent. Although referred to herein as an "agent," in general, a migration or modernization agent 138 can include a software agent, a standalone application, a server, or any other type of software application, and may be accessed using any of a GUI, CLI, web-based API, or any other type of interface. In some embodiments, instead of using an agent 138, users can instead cause the collection of application profile data 142 using other software tools or processes and can upload the data using an API provided by the software migration and modernization orchestration service 134 or other service. For example, some of the migration or modernization services may be "agentless" and enable users to perform actions without installing an agent locally in their on-premises environment.

As part of assessing a user's computing environment using agent(s) 138, in some embodiments, a user may invoke a command used to generate an inventory of applications located within the user's computing environment 132 (e.g., including software application 136 in the example of FIG. 1). In some embodiments, instead of interacting directly with an agent 138, the user 116 instead interacts with a web-based console or other interface provided by the software migration and modernization orchestration service 134. For example, at circle "1" in FIG. 1, a user may cause one or more migration and modernization request(s) 158 to be sent to the software migration and modernization orchestration service 134. The requests, for example, may provide an indication of migration and modernization actions that the user desires to perform relative to a software application 136 in the user's computing environment 132. The software migration and modernization orchestration service 134 may then in turn instruct an agent 138 or other software agents running in the user computing environment 132 to perform some or all the operations described in reference to FIG. 1 such as, for example, identifying an inventory of applications, obtaining application profile data 142 for one or more selected applications, and performing various application migration and modernization analyses. In other embodiments, the request(s) 158 may be sent directly to the agents, may be sent after an agent 138 has first created an inventory of applications in the user's computing environment, or in any other order.

In some embodiments, once a software application of interest is identified based the inventory processes described above or otherwise, at circle "3," the user may then execute a command requesting to profile and analyze the identified application 136 or such processes may execute automatically. In some embodiments, one or more agents 138 may then analyze the identified software application 136 and generate application profile data 142 containing profiling and analysis results, e.g., based on static analyses of source code or other artifacts associated with the application, dynamic analyses of the application's execution, among other possible types of analyses. Example application attributes or features identified by such analyses can include an operating system type associated with the application, an operating system version, a process identifier, application type, a programming language used to develop the application, a location at which source code for the application is stored (e.g., a source code repository location), application server type and version, database type and version, integrations with other systems, configuration information, architecture type (e.g., monolithic, 3-tier, microservice-based, etc.), application scale (e.g., number of servers, data storage size, source code size), application importance, identified anti-patterns and cloud anti-patterns associated with the application, application dependencies (e.g., on third party software and libraries, other libraries and files, execution environments), application relationships (e.g., network connections, inter-process communications (IPC), remote procedure calls (RPC)), data flow and network throughput, a number of storage volumes, a filesystem type, and the like.

In some embodiments, the application profile data 142 includes identified "subunits" of the application and dependency and performance data related to the identified subunits. For example, the dependency and performance data may include data describing dependency relations among packages, classes, methods, etc., as well as information about CPU usage, memory usage, etc., for each of the identified subunits. This application profile data 142 can be used by an agent 138 or software migration and modernization orchestration service 134, for example, to identify migration and modernization recommendations. According to embodiments described herein, features found in the application profile data can also be used as input to one or more completion time model(s) to obtain completion time forecasts for various candidate migration and modernization actions and action workflows to be performed.

In some embodiments, either automatically by a migration or modernization agent 138 or with input from a user, at circle "4," an agent 138 sends the application profile data 142 to the software migration and modernization orchestration service 134 via a secure communication channel. In some embodiments, the software migration and modernization orchestration service 134 stores the obtained data in a storage location associated with the user, e.g., in a storage bucket of a storage service 114 or in any other storage resource. In some embodiments, the software migration and modernization orchestration service 134 stores the application profile data 142 in a storage resource using a service-linked account configured by the user.

In some embodiments, at circle "5," the software migration and modernization orchestration service 134 optionally identifies one or more recommended migration and modernization orchestration plans and, in association with one or more orchestration plans (or actions or action workflows comprising an orchestration plan), generates completion time forecast(s) 156 using completion time models. As shown in FIG. 1, each of the various migration and modernization services may individually collect historical action metrics (e.g., historical action metrics 150A-150N) reflecting actions completed by each service in the past and, using the metrics data, train and use respective completion time models to generate action completion time forecast(s) as needed. For example, as users use a server migration service 122 over time to perform server migrations and associated actions, the service can collect information indicating, for each action, features of the server(s) migrated (e.g., a type of server, a type of operating system, etc.), features of the migration environment (e.g., an amount of resources devoted to the agent running in the user's computing environment, an amount of network bandwidth available, etc.), and a duration of time needed to complete the action. Other services collect similar information relevant to the actions provided by those services and monitored past action executions.

Figure 2:
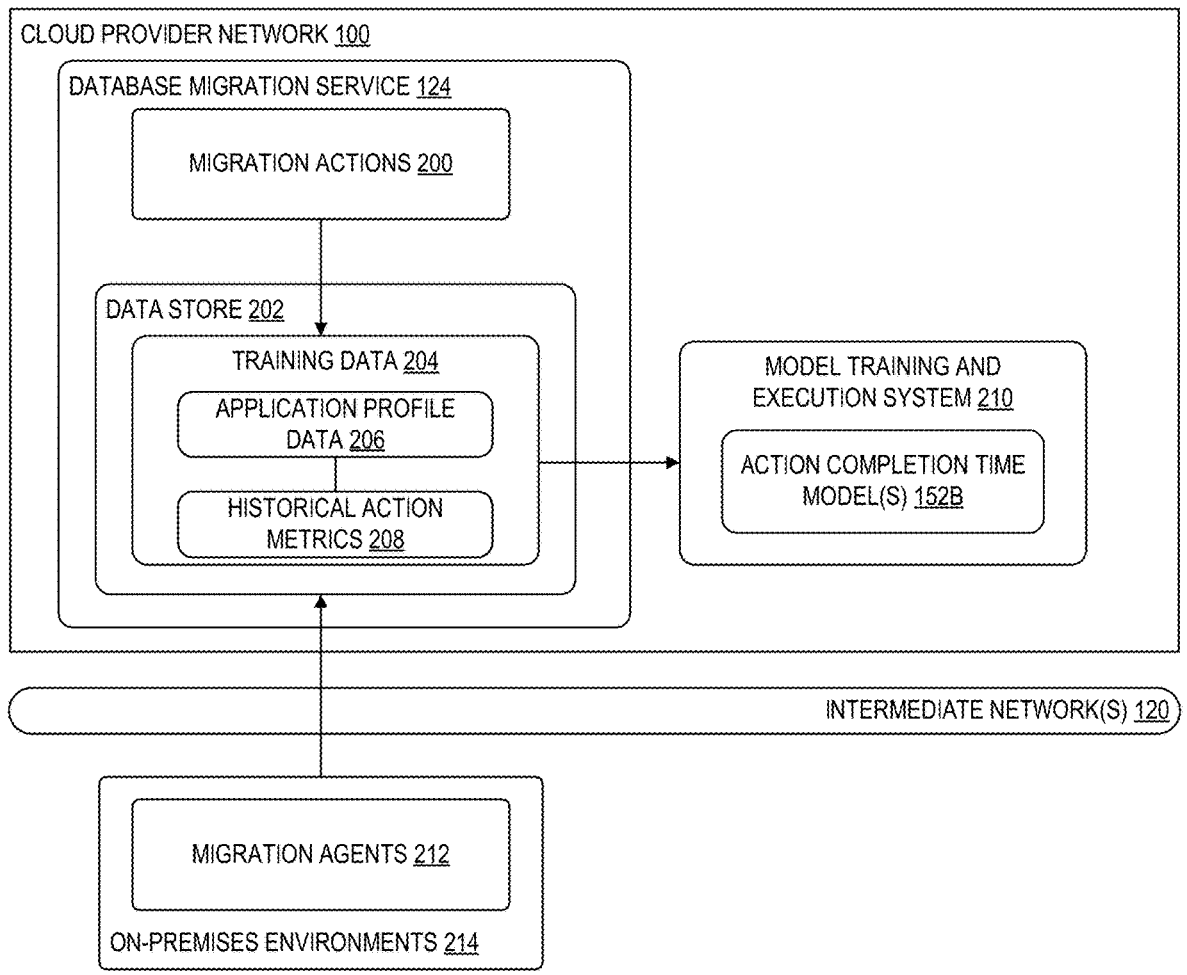
FIG. 2 is a diagram illustrating the collection of migration and modernization action training data used to train machine learning (ML) based models to forecast action completion times according to some embodiments.

FIG. 2 is a diagram illustrating the collection of migration and modernization action training data used to train ML-based models or other models to enable the generation of action completion time forecasts according to some embodiments. As shown in FIG. 2, in some embodiments, the training data 204 collected by an example database migration service 124 can include data derived from application profile data 206 generated by migration agents 212 running in various users' on-premises environments 214 and historical action metrics generated by migration actions 200, e.g., as part of migrating databases, among other possible data sources. In general, the training data includes information about users' computing resources to be migrated or modernized (including, e.g., snapshot sizes, whether a snapshot is a base snapshot or an incremental snapshot, network bandwidth available in a user's computing environment, an operating system type, an operating system version, a number of storage volumes to be migrated, a type of boot loader, a type of file system, a server workload type, an indication of when the action was performed, a region of the cloud provider network 100 associated with the action, a number of servers to be migrated in parallel, resource information associated with the agent 212, etc.) and information indicating an amount of time to complete various cloud migration actions in association with those computing resources. In some embodiments, a service may store the training data 204 in one or more data stores 202 accessible to a model training and execution system 210. In some embodiments, the training data 204 is collected on continuous basis and used to continuously train and refine an action completion time model as additional migration and modernization actions are performed.

In some embodiments, a model training and execution system 210 or other component optionally performs various data pre-processing operations on the training data 204. In some embodiments, pre-processing operations can also include organizing the data in various ways, cleaning or transforming the data, deduplicating data entries, or any other operations to aid in the model training processes. In some embodiments, the optionally preprocessed data is stored in a modernization training data store. In some embodiments, the modernization training data store can be any type of data storage managed either by the database migration service 124 or by another service or application accessible to the database migration service (e.g., by an object storage service of the provider network 100).

In some embodiments, users can interact with the model training and execution system 210 via a frontend of the model training and execution system 210. For example, a user device can provide a training request that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, a container image can include one or more layers, where each layer represents an executable instruction. Some or all the executable instructions together represent an algorithm that defines a ML model. The executable instructions (for example, the algorithm) can be written in any programming language (for example, Python, Ruby, C++, Java, etc.). In some embodiments, the algorithm is pre-generated and obtained by a user, via the user device, from an algorithm repository. In some embodiments, the algorithm is completely user-generated or partially user-generated (for example, user-provided code modifies or configures existing algorithmic code).

In some embodiments, instead of providing a container image (or identifier thereof), the user device may provide an algorithm written in any programming language. The model training and execution system 210 may then package the algorithm into a container (optionally with other code, such as a "base" ML algorithm supplemented with user-provided code) that is eventually loaded into a virtual machine instance for training a machine learning model. In some embodiments, the model training and execution system 210 can handle the acquisition and configuration of compute capacity (for example, containers, instances, etc., which are described in greater detail below) based on the information describing the computing machine on which to train a ML model provided by the user device. The model training and execution system 210 can then train ML models using the compute capacity.

To perform the ML model training, in some embodiments, computing resources execute instructions according to hyperparameter values included in the training request. As an illustrative example, a model training and execution system 210 trains a ML model by identifying values for certain parameters (for example, coefficients, weights, centroids, etc.). The identified values depend on hyperparameters that define how the training is performed. Thus, the computing resources can execute the executable instructions to initiate a ML model training process, where the training process is run using the hyperparameter values included in the training request. Execution can include applying the obtained training data as input parameters to some or all the instructions being executed.

In some embodiments, the model training processes generate model data. The model data may be stored, for example, in one or more data files in a model data store and can include characteristics of the ML model being trained, such as a number of layers in the machine learning model, hyperparameters of the machine learning model, coefficients of the machine learning model, weights of the machine learning model, and/or the like. In particular, the generated model data includes values for the characteristics that define the ML model being trained. As shown in FIG. 2, one or more action completion time model(s) 152B may be generated for the database migration service 124 that enable the service to generate forecasts of an amount of time needed to perform various actions based on input specifying various application and migration environment features, as described above.

In some embodiments, the model training and execution system 210 further includes a model execution system (which may be part of or separate from the model training system), including a single physical computing device or multiple physical computing devices that are interconnected using one or more computing networks (not shown), where the physical computing device(s) host one or more virtual machine instances. The model training and execution system 210 can handle the acquisition and configuration of compute capacity (for example, containers, instances, etc.) based on requests to execute trained ML models. The model training and execution system 210 can then execute ML models using the compute capacity.

In some embodiments, a request to execute a ML model is transmitted to the model training and execution system 210, where the request includes an input to a ML model (for example, a set of input data). The model training and execution system 210 or another system executes the code in response to receiving the execution request. In particular, execution of the code causes the executable instructions in the code corresponding to the algorithm to read the model data file (e.g., model data obtained from a model data store), use the input included in the execution request as an input parameter, and generate a corresponding output. As an illustrative example, the algorithm can include coefficients, weights, layers, cluster centroids, and/or the like. The executable instructions in the code corresponding to the algorithm can read the model data file to determine values for the coefficients, weights, layers, cluster centroids, and/or the like. The executable instructions can include input parameters, and the input included in the execution request can be supplied as the input parameters. With the ML model characteristics and the input parameters provided, execution of the executable instructions can be completed resulting in an output. In some embodiments, the output is stored in a data store. Alternatively or in addition, the model training and execution system 210 transmits the output to a user device that submitted the execution request. In some embodiments, the operating environment supports many different types of machine learning models, such as classification models, multi arm bandit models, reinforcement learning models, ensemble machine learning models, deep learning models, and/or the like.

As indicated above, in some embodiments, at circle "5" in FIG. 1, a software migration and modernization orchestration service 134 generates migration and modernization orchestration plan recommendations (sometimes also referred to as migration orchestration plans or modernization orchestration plans) based on user input indicating types of migration and modernization actions to be performed, the application profile data 142 associated with an application to be migrated and modernized, among other possible input. In some embodiments, a software migration and modernization ontology model is defined and used to describe migration and modernization orchestration plans (including associated actions and action workflows), although generally other types of data structures and models can be used such as decision trees, text-based models, database models, machine learning (ML) based models etc. In general, the software migration and modernization knowledgebase includes data indicating relevant features and constraints associated with various candidate migration and modernization orchestration workflows and associated actions and action workflows.

Figure 3:
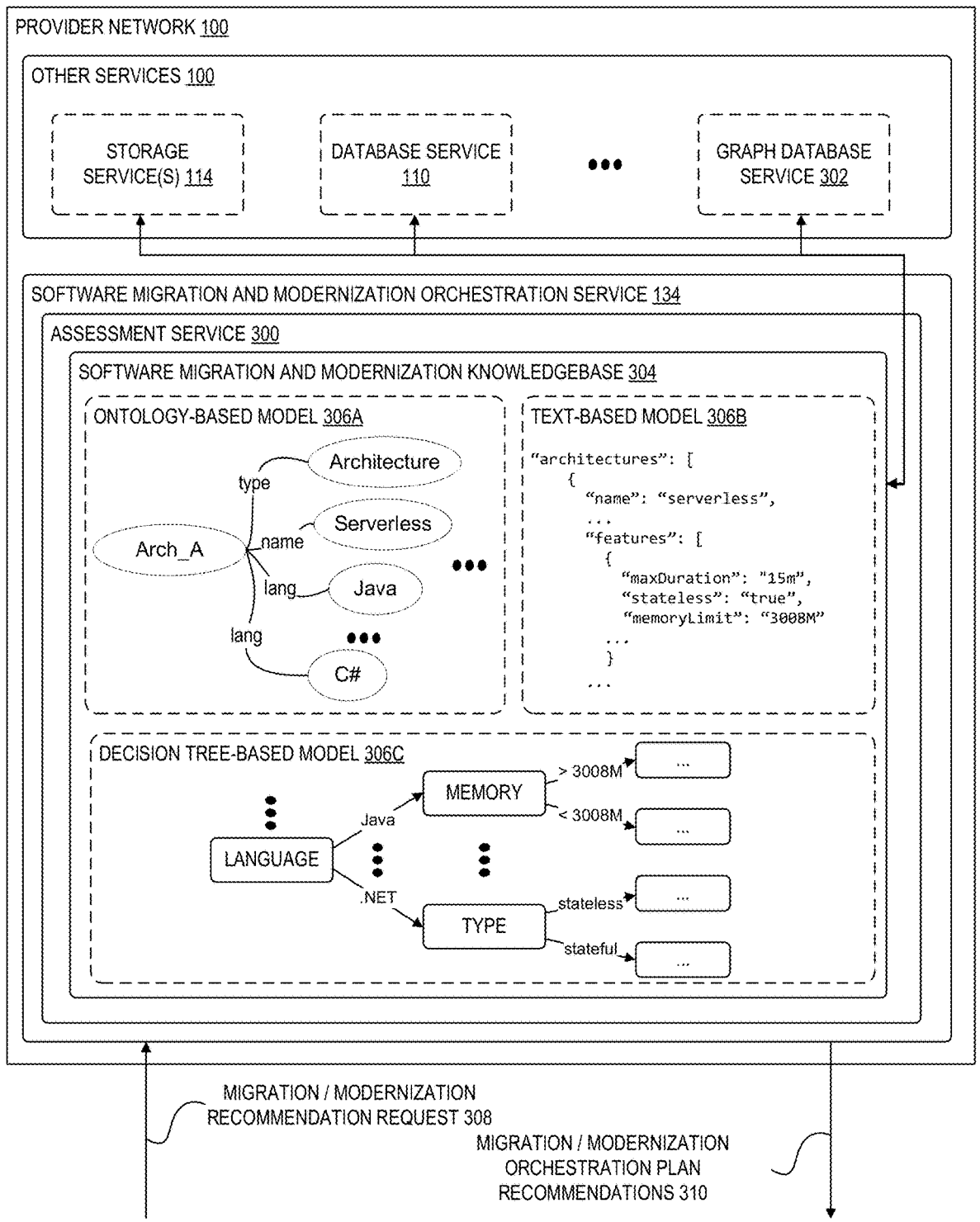
FIG. 3 is a diagram illustrating an assessment service used to identify candidate migration and modernization orchestration plans for a user's software application or system according to some embodiments.

FIG. 3 is a diagram illustrating the use of a software migration and modernization knowledgebase to identify suitable migration and modernization workflows for a software application according to some embodiments. In some embodiments, the knowledgebase 304 includes one or more data models describing the features and constraints of various migration and modernization orchestration plans, actions, and action workflows. For example, the data models can include one or more ontology models 304A, where an ontology model enables the software migration and modernization domain and its associated resources become semantic, or self-explanatory, to an assessment engine of a software migration and modernization orchestration service 134 and possibly other tools. The ability to use such ontologies, for example, increases integration, querying, and interoperability of the service. For example, the migration and modernization knowledgebase 304 is flexibly defined, where modifications to migration and modernization models stored in the knowledge base including adding, removing, or modifying a data model rather than static relationships and restrictions between the resources are hard coded into an application. In some embodiments, a migration and modernization knowledgebase 304 includes one or more text-based models 304B (e.g., text-based descriptions of the features and constraints associated with various types of software architectures), decision tree-based models 304C, or any other type of data models. A decision tree-based model, for example, includes nodes and edges that form a flow-chart-like structure, where the paths from a root node to leaf nodes represent a set of classification rules for candidate migration and modernization orchestration plans, actions, and action workflows. In this example, a decision tree-based model can be queried to test attributes of the software application being analyzed against various conditions defined by the model and representing the features and constraints of candidate migration and modernization orchestration plans, actions, and action workflows (e.g., server migration actions, containerization actions, refactoring actions, etc.).

As indicated above, in some embodiments, a migration and modernization knowledgebase 304 is a repository of information about the software migration and modernization domain, where the information is defined using a modernization ontology and associated modernization data models (e.g., instances of the modernization ontology used to describe migration and modernization strategy, tools, or other information). In some embodiments, a modernization ontology is a single interconnected ontology, or may be a collection of related ontologies that may not be directly connected to one another. In some embodiments, the migration and modernization ontology is specified at least in part using the Resource Description Framework (RDF), RDF Schema (RDFS), Web Ontology Language (OWL), or any other type of metadata data model. These metadata data models generally can be used to conceptually describe and model the migration and modernization information including, for example, migration and modernization tools, tool features and constraints, development pattern and anti-pattern information (including various types of cloud anti-patterns), software architectures, and so forth.

In some embodiments, a software migration and modernization knowledgebase 304 is stored in a database or other data repository, where the data repository may be managed by the software migration and modernization orchestration service 134 directly or by another service of a cloud provider network 100. For example, depending on the format of the models, the models may be stored in any of a storage service 114, a database service 110, graph database service 302, or any other type of storage resource accessible to the assessment services.

In some embodiments, the determination of whether a particular migration or modernization orchestration plan, action, or action workflow is suitable for a given application (e.g., responsive to one or more migration or modernization recommendation requests 308) is based at least in part on querying a data model describing migration and modernization actions with values from the application profile data 142 collected for an application. The orchestration plans, actions, and action workflows can include sets of actions provided by any set of migration and modernization services provided by the provider network 100. For example, if the application profile data 142 indicates that an application 136 is implemented using the C# programming language, the assessment service may query the software migration and modernization data models to identify (or to rule out) software cloud migration actions provided by various services that support the use of the identified language. Similarly, the software migration and modernization orchestration service 134 may query the data models to determine whether the amount of memory used by an application is suitable for one or more actions, whether the stateful or stateless nature of an application is supported by one or more actions, whether an application's use of a local filesystem, database, in-memory calls, share-memory interface calls, failure handling, or any other characteristics of an application defined in the application profile data 142 are suitable for a given migration or modernization orchestration plan, action, or action workflow based on the features and constraints defined in the data models. In some embodiments, the results from querying the data models can be provided as migration or modernization orchestration plan recommendations 310 for display in status reports or used by other processes.

In some embodiments, the identification of recommended or requested migration or modernization orchestration plans, actions, or action workflows includes obtaining associated completion time forecasts. For example, the software migration and modernization orchestration service 134 can provide at least a portion of application profile data 142 and identified orchestration plans, actions, or action workflows to be performed as input to relevant completion time model(s) 152A-152N to obtain completion time forecasts. In other embodiments, users can directly request such forecasts from the individual services for specified actions. For example, if it is desired to obtain a forecast of an estimated duration of time needed to migrate three servers and two databases based on profile data obtained about the servers and databases, such information can be provided as input to the completion time models of relevant server migration service 122 and database migration service 124. As indicated above, each service can use a model training and execution system to obtain the requested forecasts using the models trained by each service.

As indicated above, in some cases it may be desirable to obtain a completion time forecast for an orchestration plan comprising multiple actions or action workflows to be performed by any number of separate services. In some embodiments, the time forecasts obtained for such orchestration plans can include forecasts obtained for each action of an orchestration plan individually or such forecasts may be aggregated to obtain a total forecast for an orchestration plan as a whole. In some embodiments, an aggregate forecast for an orchestration plan may be calculated in part based on determined dependencies among the actions of the orchestration plan. For example, the software migration and modernization orchestration service 134 may determine, for an orchestration plan, which actions are to be performed sequentially (e.g., because the output of an action is used as input to a second action) and which actions can be performed in parallel. For example, if an orchestration plan includes actions A, B, and C, and actions B and C can be performed in parallel but only once action A completes, then an aggregated forecast for the orchestration plan can be obtained by adding a forecasted time for action A to the longer of the forecasted times for actions B and C.

Figure 4:
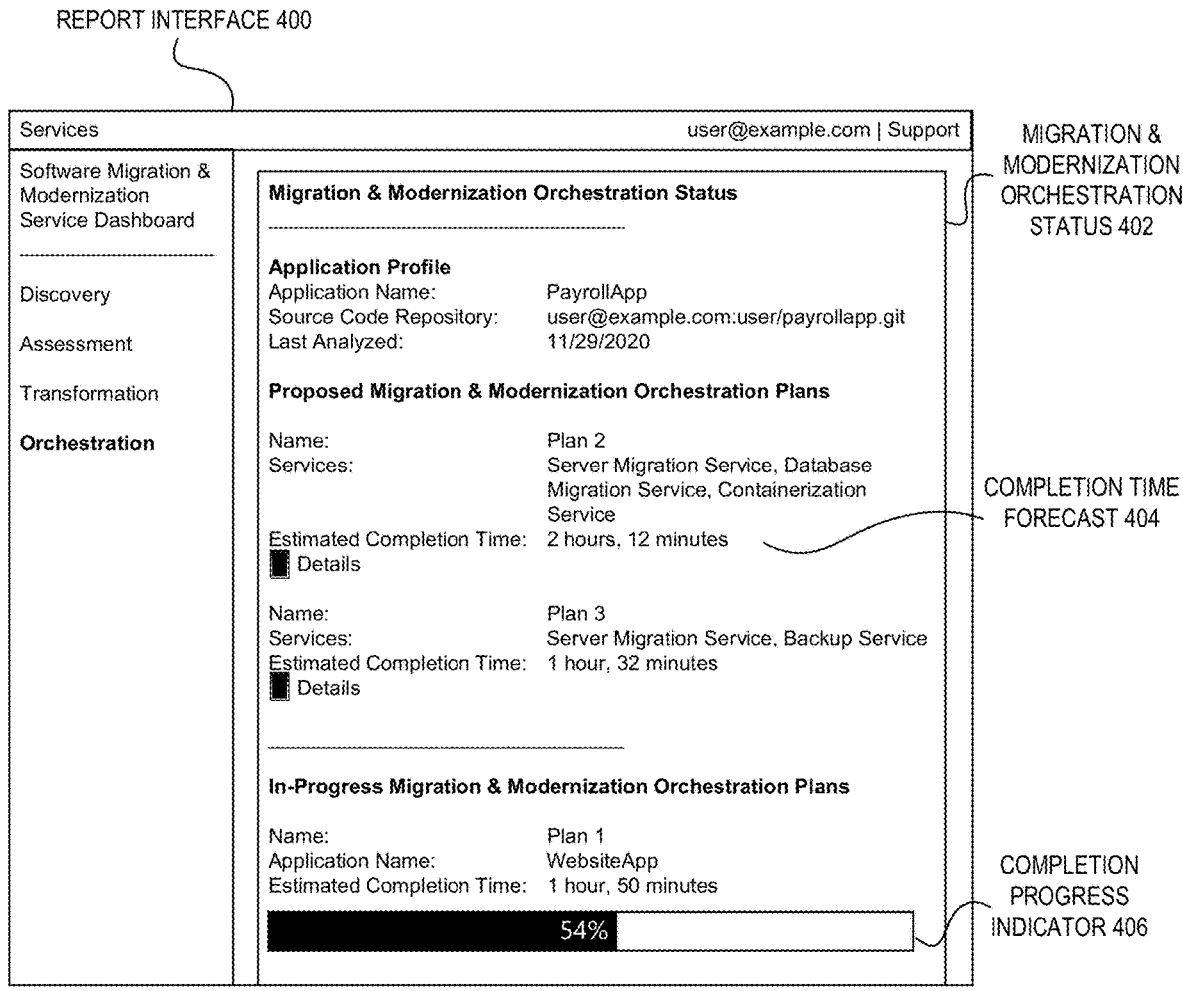
FIG. 4 illustrates an example graphical interface displaying example migration and modernization orchestration plan recommendations, associated completion time forecasts, and an example interface element indicating an estimated percentage completion for an in-progress migration or modernization orchestration plan according to some embodiments.

In some embodiments, once the migration and modernization orchestration plan recommendations and associated completion time forecasts are obtained, at circle "6," the software migration and modernization orchestration service 134 provides access to a migration and modernization status report 154. For example, the status report 154 may be provided in web-based console or other interface that displays the orchestration plan recommendation information and associated completion time forecasts 156, among other possible information. FIG. 4 illustrates an example graphical interface displaying example migration and modernization orchestration plan recommendations, associated completion time forecasts, and an example interface element indicating an estimated percentage completion for an in-progress orchestration plan according to some embodiments. As shown, the report interface 400 includes a migration and modernization status report 402 which, for example, may have been generated responsive to a user request to perform one or more cloud migration actions relative to a software application in the user's computing environment. The status report 402, for example, includes profile information about the application and one or more proposed orchestration plans.

In some embodiments, a status report 402 includes the display of a completion time forecast 404 which, in this example, indicates an estimated duration of time needed to complete the migration and modernization orchestration plan named "Plan 2." As indicated in the status report 402, this example orchestration plan involves the use of several services including a server migration service, a database migration service, and a containerization service. The indicated completion time forecast 404 thus indicates an expected duration of time needed for each of the services to perform their respective actions or action workflows on the user's application. In some embodiments, a status report 402 may further display individual completion time forecasts for each of the actions involved in the orchestration plan.

In some embodiments, the status report 402 further illustrates the display of a completion progress indicator 406 indicating an estimated completion percentage of a migration and modernization orchestration plan that is currently in-progress. For example, execution of the orchestration plan named "Plan 1" was previously initiated and is expected to need 1 hour and 50 minutes to complete. Based on an amount of time that has elapsed since execution of the orchestration plan was initiated, the completion progress indicator 406 can display an expected completion percentage of the orchestration plan.

Figure 5:
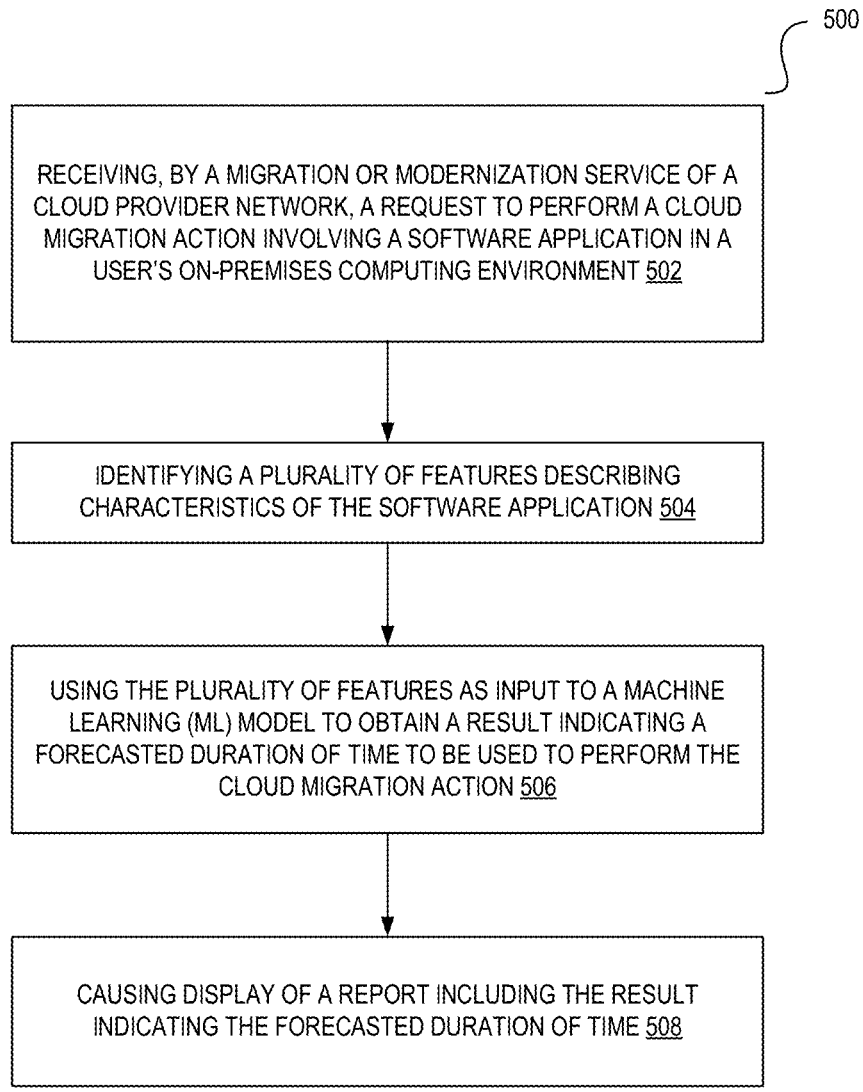
FIG. 5 is a flow diagram illustrating operations of a method for providing action completion time forecasts for various types of software modernization and migration-related actions according to some embodiments.

FIG. 5 is a flow diagram illustrating operations 500 of a method for providing action completion time forecasts for various types of software modernization and migration-related actions according to some embodiments. Some or all the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the software migration and modernization services of the other figures.

The operations 500 include, at block 502, receiving, by a migration or modernization service of a cloud provider network, a request to perform a cloud migration action involving a software application in a user's on-premises computing environment;

The operations 500 further include, at block 504, identifying a plurality of features describing characteristics of the software application.

The operations 500 further include, at block 506, using the plurality of features as input to a machine learning (ML) model to obtain a result indicating a forecasted duration of time to be used to perform the cloud migration action.

The operations 500 further include, at block 508, causing display of a report including the result indicating the forecasted duration of time.

In some embodiments, the operations 500 further include obtaining, by the migration or modernization service, historical data indicating, for each action execution of a plurality of past process executions performed by the migration or modernization service, features associated with a software application upon which the action execution was performed, and a duration of time to complete the action execution; and training the ML model using the historical data to forecast process action completion times based on software application features.

In some embodiments, the operations 500 further include causing display of a progress indicator providing an estimate of a completion percentage of the cloud migration action, wherein the completion percentage is based on the forecasted duration of time to be used to perform the cloud migration action and a duration of time elapsed since execution of the cloud migration action was initiated.

In some embodiments, the operations 500 further include receiving a request to migrate the software application from the user's on-premises computing environment to the cloud provider network, wherein the software application comprises a plurality of computing resources; generating a orchestration plan to be used to migrate the plurality of computing resources to the cloud provider network, wherein the orchestration plan includes a plurality of cloud migration actions including the cloud migration action; obtaining a plurality of results indicating a respective forecasted duration of time to be used to perform each of the plurality of cloud migration actions; determining an orchestration plan completion time forecast based on the plurality of results; and causing display of the orchestration plan completion time forecast.

In some embodiments, the operations 500 further include receiving a request to migrate the software application from the user's on-premises computing environment to the cloud provider network, wherein the software application comprises a plurality of computing resources; identifying a plurality of candidate orchestration plans to be used to migrate the plurality of computing resources to the cloud provider network; determining a plurality of orchestration plan completion time forecasts, wherein each of the orchestration plan completion time forecasts is associated with a respective orchestration plan of the plurality of candidate orchestration plans; and causing display of the plurality of orchestration plan completion time forecasts.

In some embodiments, the operations 500 further include receiving a request to migrate the software application from the user's on-premises computing environment to the cloud provider network, wherein the software application comprises a plurality of computing resources; identifying a plurality of candidate orchestration plans to be used to migrate the plurality of computing resources to the cloud provider network; determining plurality of orchestration plan completion time forecasts, wherein each of the orchestration plan completion time forecasts is associated with a respective orchestration plan of the plurality of candidate orchestration plans; selecting a orchestration plan of the plurality of candidate orchestration plans based on the plurality of orchestration plan completion time forecasts; and executing the orchestration plan to migrate the software application to the cloud provider network.

In some embodiments, the operations 500 further include sending, to a migration and modernization recommendation service, a request for one or more recommended orchestration plans for the software application, wherein the migration and modernization recommendation service queries a data model defining a plurality of orchestration plans to identify a recommended orchestration plan for the software application, and wherein the data model is queried using at least a portion of the plurality of features describing characteristics of the software application; and causing display of information describing the recommended orchestration plan.

In some embodiments, the ML model is a first ML model and the result is a first result, wherein the migration or modernization process is part of a migration workflow including a plurality of cloud migration actions, wherein the plurality of migration and modernization actions includes a cloud migration action performed by a software agent running in the user's on-premises computing environment, and wherein the operations 500 further include: using the plurality of features as input to a second ML model to obtain a second result indicating a forecasted duration of time to be used to perform the cloud migration action performed by the software agent; and providing access to the second result.

In some embodiments, the ML model is a first ML model and the result is a first result, wherein the cloud migration action is part of an orchestration plan including a plurality of cloud migration actions, wherein the plurality of migration and modernization actions includes a cloud migration action performed by a software agent running in the user's on-premises computing environment, and wherein the operations 500 further include: receiving input indicating an amount of computing resources available to a software agent running in the user's on-premises computing environment; using the plurality of features and the input indicating the amount of computing resources available to the software agent as input to a second ML model to obtain a second result indicating a forecasted duration of time to be used to perform the cloud migration action performed by the software agent; and providing access to the second result.

In some embodiments, the operations 500 further include executing the cloud migration action; determining a duration of time used to execute the cloud migration action; and using the plurality of features and the duration of time to further train the ML model.

In some embodiments, the migration or modernization service is provided in a plurality of regions of the cloud provider network, wherein the ML model is associated with a region of the plurality of regions, and wherein each region of the plurality of regions is associated with a respective ML model trained based on data obtained from the region.

In some embodiments, the cloud migration action is part of an orchestration plan including a plurality of cloud migration actions, and wherein the operations 500 further include: obtaining a plurality of forecasted durations of time corresponding to the plurality of cloud migration actions; identifying an execution order associated with the plurality of cloud migration actions, wherein identifying the execution order includes identifying actions to be performed sequentially and actions that can be performed in parallel; and generating an orchestration plan completion time forecast based on the plurality of forecasted durations of time and the identified execution order.

Figure 6:
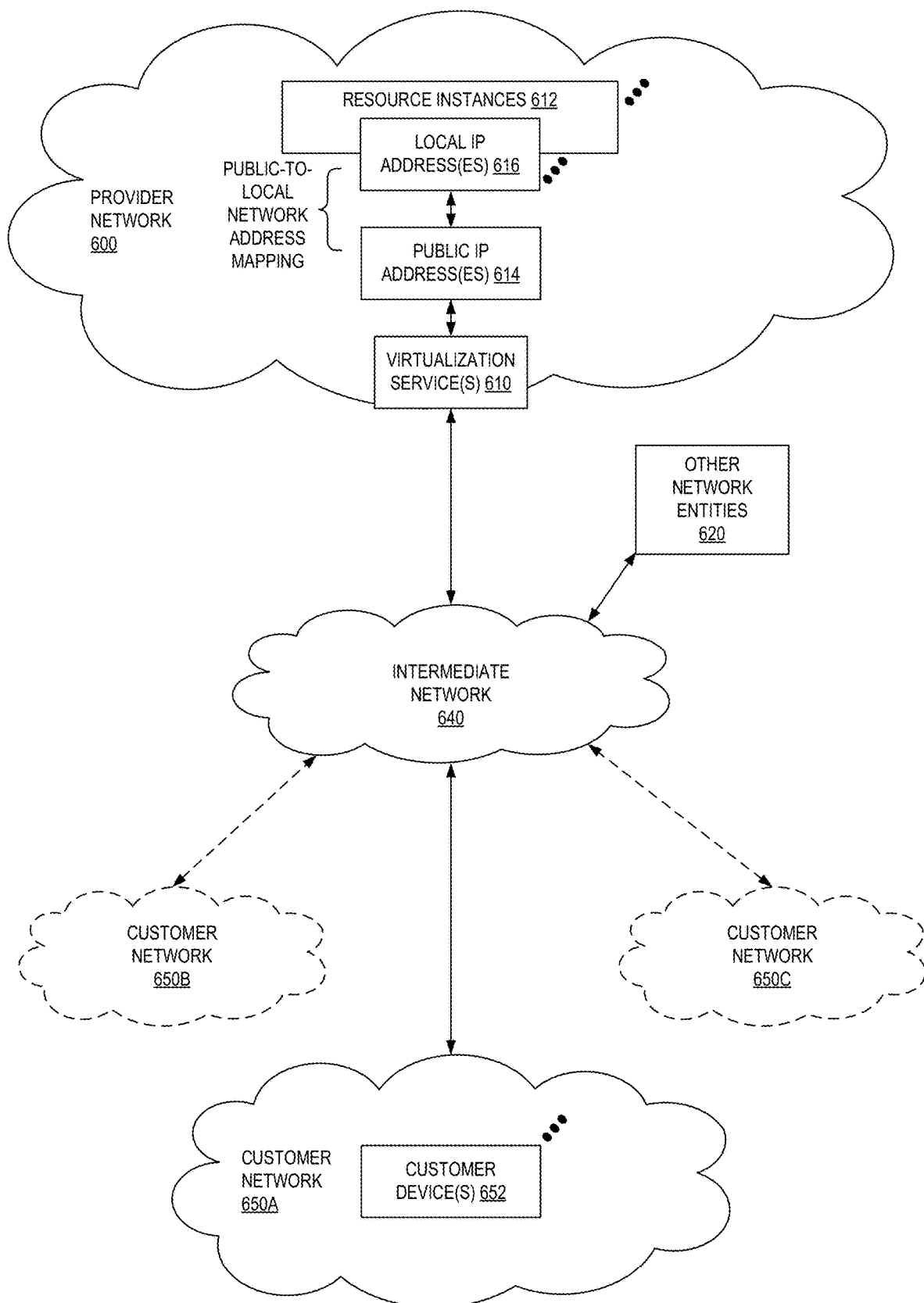
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
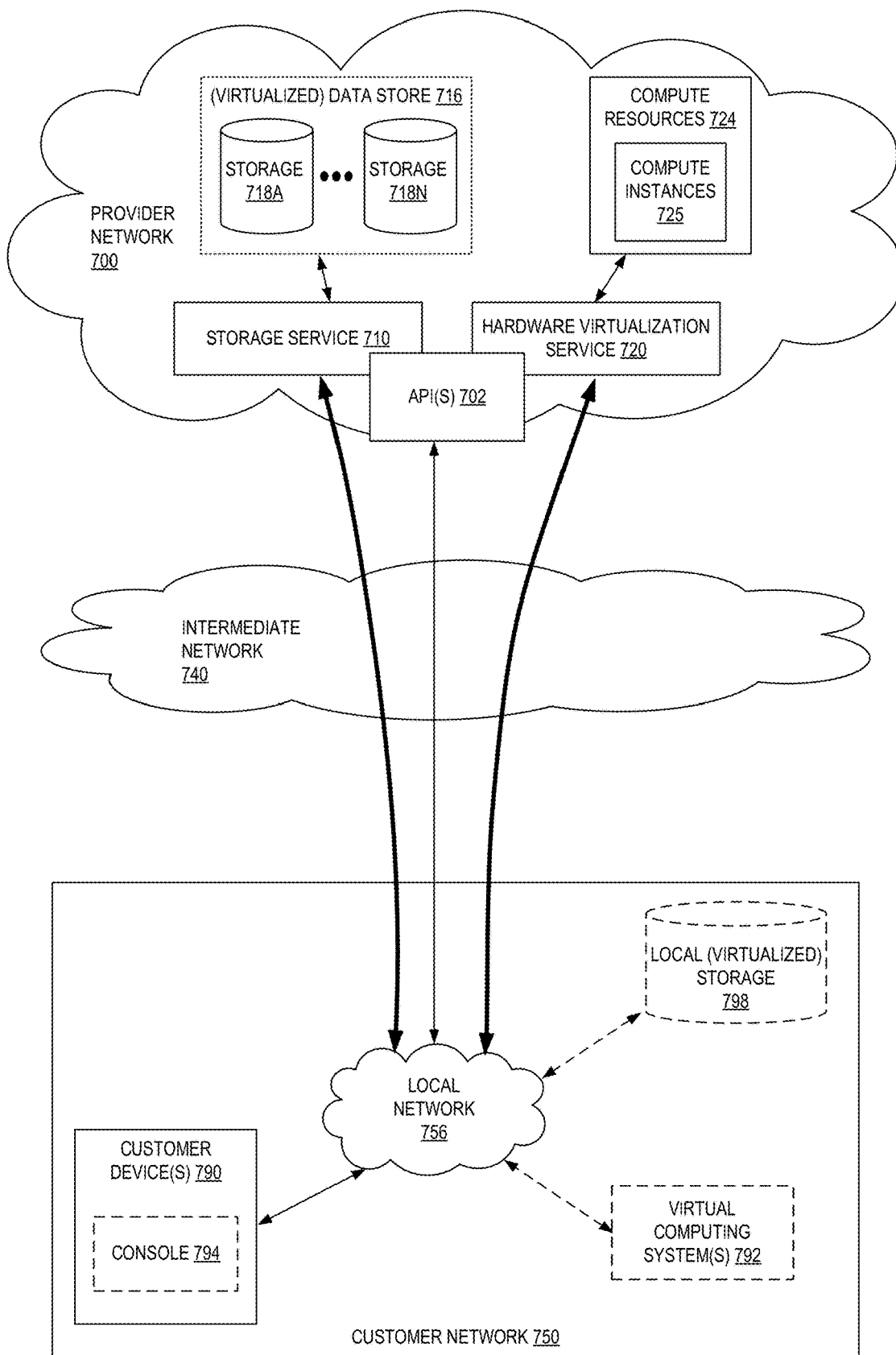
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
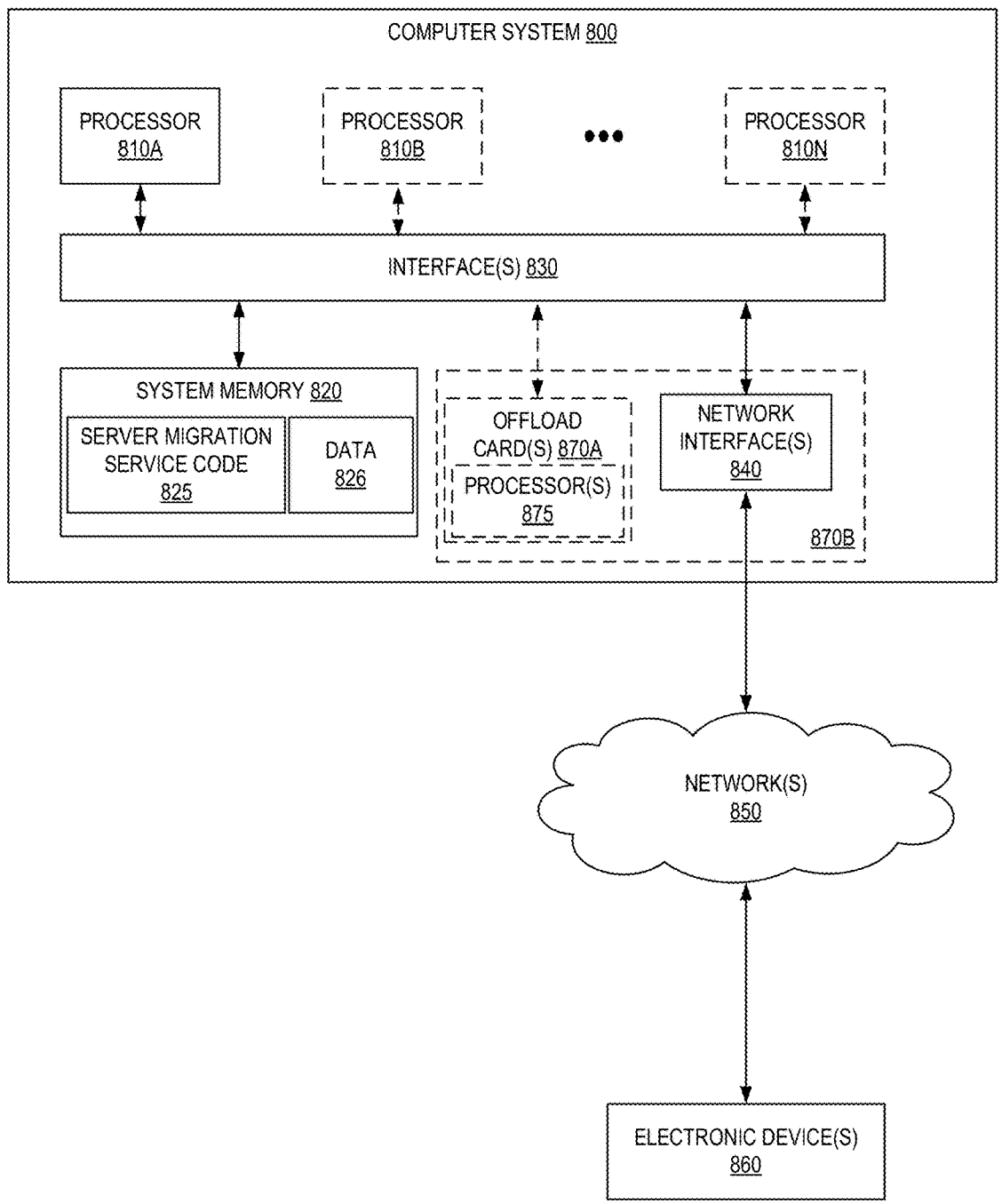
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as software migration and modernization orchestration service code 825 (e.g., executable to implement, in whole or in part, the software migration and modernization orchestration service 134 or constituent services thereof) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device.

As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a migration or modernization service of a cloud provider network, a request to migrate a software application from a user's on-premises computing environment to the cloud provider network, wherein the software application comprises a plurality of computing resources;
   generating an orchestration plan to be used by the migration or modernization service to migrate the plurality of computing resources to the cloud provider network, wherein the orchestration plan includes a plurality of cloud migration actions to be performed by the migration or modernization service of the cloud provider network;
   identifying a plurality of features describing characteristics of the software application;
   using the plurality of features as input to one or more machine learning (ML) models to obtain a result indicating a forecasted duration of time for one or more components of the migration or modernization service to perform the plurality of cloud migration actions; and
   causing display of a migration report including the result.

2. The computer-implemented method of claim 1, further comprising:
   obtaining, by the migration or modernization service, historical data indicating, for each action execution of a plurality of past action executions performed by the migration or modernization service, features associated with a software application upon which the action execution was performed, and a duration of time to complete the action execution; and
   training an ML model of the one or more ML models using the historical data to forecast action completion times based on software application features.

3. The computer-implemented method of claim 1, further comprising causing display of a progress indicator providing an estimate of a completion percentage of the orchestration plan, wherein the completion percentage is based on the forecasted duration of time for one or more components of the migration or modernization service to perform the plurality of cloud migration actions and a duration of time elapsed since execution of the orchestration plan was initiated.

4. A computer-implemented method comprising:
   receiving, by a migration or modernization service of a cloud provider network, a request for the migration or modernization service to perform a cloud migration action involving a software application in a user's on-premises computing environment;
   identifying a plurality of features describing characteristics of the software application;
   using the plurality of features as input to a machine learning (ML) model to obtain a result indicating a forecasted duration of time for one or more components of the migration or modernization service to perform the cloud migration action; and
   providing access to the result indicating the forecasted duration of time.

5. The computer-implemented method of claim 4, further comprising:
   obtaining, by the migration or modernization service, historical data indicating, for each action execution of a plurality of past action executions performed by the migration or modernization service, features associated with a software application upon which the action execution was performed, and a duration of time to complete the action execution; and
   training the ML model using the historical data to forecast action completion times based on software application features.

6. The computer-implemented method of claim 4, further comprising causing display of a progress indicator providing an estimate of a completion percentage of the cloud migration action, wherein the completion percentage is based on the forecasted duration of time for one or more components of the migration or modernization service to perform the cloud migration action and a duration of time elapsed since execution of the cloud migration action was initiated.

7. The computer-implemented method of claim 4, further comprising:
   receiving a request to migrate the software application from the user's on-premises computing environment to the cloud provider network, wherein the software application comprises a plurality of computing resources;
   generating an orchestration plan to be used by the migration or modernization service to migrate the plurality of computing resources to the cloud provider network, wherein the orchestration plan includes a plurality of cloud migration actions including the cloud migration action;
   obtaining a plurality of results indicating a respective forecasted duration of time to be used for the migration or modernization service to perform each of the plurality of cloud migration actions;
   determining an orchestration plan completion time forecast based on the plurality of results; and
   causing display of the orchestration plan completion time forecast.

8. The computer-implemented method of claim 4, further comprising:
   receiving a request to migrate the software application from the user's on-premises computing environment to the cloud provider network, wherein the software application comprises a plurality of computing resources;
   identifying a plurality of candidate orchestration plans for the migration or modernization service to migrate the plurality of computing resources to the cloud provider network;
   determining a plurality of orchestration plan completion time forecasts, wherein each of the orchestration plan completion time forecasts is associated with a respective orchestration plan of the plurality of candidate orchestration plans; and
   causing display of the plurality of orchestration plan completion time forecasts.

9. The computer-implemented method of claim 4, further comprising:

receiving a request to migrate the software application from the user's on-premises computing environment to the cloud provider network, wherein the software application comprises a plurality of computing resources;

identifying a plurality of candidate orchestration plans for the migration or modernization service to migrate the plurality of computing resources to the cloud provider network;

determining plurality of orchestration plan completion time forecasts, wherein each of the orchestration plan completion time forecasts is associated with a respective orchestration plan of the plurality of candidate orchestration plans;

selecting an orchestration plan of the plurality of candidate orchestration plans based on the plurality of orchestration plan completion time forecasts; and executing the orchestration plan to migrate the software application to the cloud provider network.

10. The computer-implemented method of claim 4, further comprising:

sending, to the migration and modernization recommendation service, a request for one or more recommended orchestration plans for the software application, wherein the migration and modernization recommendation service queries a data model defining a plurality of orchestration plans to identify a recommended orchestration plan for the software application, and wherein the data model is queried using at least a portion of the plurality of features describing characteristics of the software application; and causing display of information describing the recommended orchestration plan.

11. The computer-implemented method of claim 4, wherein the ML model is a first ML model and the result is a first result, wherein the migration or modernization process is part of a migration workflow including a plurality of cloud migration or modernization actions, wherein the plurality of migration or modernization actions includes a cloud migration or modernization action performed by a software agent running in the user's on-premises computing environment, and wherein the method further comprises:

using the plurality of features as input to a second ML model to obtain a second result indicating a forecasted duration of time for the migration or modernization service to perform the cloud migration action performed by the software agent; and providing access to the second result.

12. The computer-implemented method of claim 4, wherein the ML model is a first ML model and the result is a first result, wherein the cloud migration action is part of an orchestration plan including a plurality of cloud migration actions, wherein the plurality of migration and modernization actions includes a cloud migration action performed by a software agent running in the user's on-premises computing environment, and wherein the method further comprises:

receiving input indicating an amount of computing resources available to a software agent running in the user's on-premises computing environment;

using the plurality of features and the input indicating the amount of computing resources available to the software agent as input to a second ML model to obtain a second result indicating a forecasted duration of time for the migration or modernization service to perform the cloud migration action performed by the software agent; and providing access to the second result.

13. The computer-implemented method of claim 4, further comprising:

executing the cloud migration action;

determining a duration of time used to execute the cloud migration action; and using the plurality of features and the duration of time to further train the ML model.

14. The computer-implemented method of claim 4, wherein the migration or modernization service is provided in a plurality of regions of the cloud provider network, wherein the ML model is associated with a region of the plurality of regions, and wherein each region of the plurality of regions is associated with a respective ML model trained based on data obtained from the region.

15. The computer-implemented method of claim 4, wherein the cloud migration action is part of an orchestration plan including a plurality of cloud migration actions, and wherein the method further comprises:

obtaining a plurality of forecasted durations of time corresponding to the plurality of cloud migration actions;

identifying an execution order associated with the plurality of cloud migration actions, wherein identifying the execution order includes identifying actions to be performed sequentially and actions that can be performed in parallel; and generating an orchestration plan completion time forecast based on the plurality of forecasted durations of time and the identified execution order.

16. A system comprising:

a first one or more electronic devices to implement a migration or modernization service in a cloud provider network, wherein the first one or more electronic devices include a first central processing unit (CPU) and a first memory, and wherein the migration or modernization service includes instructions that upon execution cause the migration or modernization service to:

receive a request to perform a cloud migration action involving a software application in a user's on-premises computing environment, identify a plurality of features describing characteristics of the software application, use the plurality of features as input to a machine learning (ML) model to obtain a result indicating a forecasted duration of time for one or more components of the migration or modernization service to perform the cloud migration action, and cause display of a report including the result indicating the forecasted duration of time; and a second one or more electronic devices to implement a software agent running in the user's on-premises computing environment, wherein the second one or more electronic devices include a second CPU and a second memory, and wherein the software agent includes instructions that upon execution cause the software agent to:

obtain application profile data for the software application, wherein the application profile data indicates the plurality of features, and send the application profile data to the migration or modernization service.

17. The system of claim 16, wherein the migration or modernization service includes instructions that upon execution further cause the migration or modernization service to:

obtain, by the migration or modernization service, historical data indicating, for each action execution of a plurality of past action executions performed by the migration or modernization service, features associated with a software application upon which the action execution was performed, and a duration of time to complete the action execution; and train the ML model using the historical data to forecast action completion times based on software application features.

18. The system of claim 16, wherein the migration or modernization service includes instructions that upon execution further cause the migration or modernization service to cause display of a progress indicator providing an estimate of a completion percentage of the cloud migration action, wherein the completion percentage is based on the forecasted duration of time for one or more components of the migration or modernization service to perform the cloud migration action and a duration of time elapsed since execution of the cloud migration action was initiated.

19. The system of claim 16, wherein the migration or modernization service includes instructions that upon execution further cause the migration or modernization service to:

receive a request for the migration or modernization service to migrate the software application from the user's on-premises computing environment to the cloud provider network, wherein the software application comprises a plurality of computing resources;

generate an orchestration plan to be used by the migration or modernization service to migrate the plurality of computing resources to the cloud provider network, wherein the orchestration plan includes a plurality of cloud migration actions including the cloud migration action;

obtain a plurality of results indicating a respective forecasted duration of time to be used for the migration or modernization service to perform each of the plurality of cloud migration actions;

determine an orchestration plan completion time forecast based on the plurality of results; and cause display of the orchestration plan completion time forecast.

20. The system of claim 16, wherein the migration or modernization service includes instructions that upon execution further cause the migration or modernization service to:

receive a request for the migration or modernization service to migrate the software application from the user's on-premises computing environment to the cloud provider network, wherein the software application comprises a plurality of computing resources;

identify a plurality of candidate orchestration plans for the migration or modernization service to migrate the plurality of computing resources to the cloud provider network;

determine a plurality of orchestration plan completion time forecasts, wherein each of the orchestration plan completion time forecasts is associated with a respective orchestration plan of the plurality of candidate orchestration plans; and cause display of the plurality of orchestration plan completion time forecasts.

* * * * *